United States Patent
Bok et al.

(10) Patent No.: US 7,641,546 B2
(45) Date of Patent: Jan. 5, 2010

(54) COOLING APPARATUS AND METHOD FOR CONTROLLING THE SAME

(75) Inventors: Ki So Bok, Seoul (KR); Hyung Jin Lim, Bucheon-Si (KR); Dae Woo Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 453 days.

(21) Appl. No.: 11/368,409

(22) Filed: Mar. 7, 2006

(65) Prior Publication Data

US 2006/0291994 A1  Dec. 28, 2006

(30) Foreign Application Priority Data

Mar. 30, 2005  (KR) ............... 10-2005-0026309
Mar. 30, 2005  (KR) ............... 10-2005-0026321

(51) Int. Cl.
F24F 11/00 (2006.01)
F24F 7/007 (2006.01)
H05K 5/00 (2006.01)
G03B 21/16 (2006.01)

(52) U.S. Cl. ............ 454/239; 454/184; 454/256; 353/52; 417/32

(58) Field of Classification Search ......... 454/184, 454/239, 256; 353/52; 417/32
See application file for complete search history.

(56) References Cited

U.S. PATENT DOCUMENTS 2,509,889 A * 5/1950 Shockley ............... 73/179
5,121,291 A * 6/1992 Cope et al. ............. 361/695
5,237,338 A * 8/1993 Stephenson ............ 347/223
6,127,663 A * 10/2000 Jones ..................... 219/553
6,595,005 B1 * 7/2003 Immel ..................... 62/3.7
6,824,362 B2 * 11/2004 Dodson, III ............ 417/22
2003/0216882 A1  11/2003 Lai et al.
2004/0040318 A1  3/2004 Getz et al.
2005/0019162 A1 * 1/2005 Delano et al. .......... 416/1
2005/0019164 A1 * 1/2005 Delano et al. .......... 416/61
2005/0287008 A1 * 12/2005 Lacey et al. ............ 417/32
2006/0290895 A1 * 12/2006 Park et al. .............. 353/61

FOREIGN PATENT DOCUMENTS

EP   1107093 A3    6/2001
EP   1708068 A1 * 10/2006
WO  WO 2006104302 A1 * 10/2006

* cited by examiner

*Primary Examiner*—Steven B McAllister
*Assistant Examiner*—Patrick F. O'Reilly, III
(74) *Attorney, Agent, or Firm*—Birch, Stewart, Kolasch & Birch, LLP

(57) ABSTRACT

A cooling apparatus and a method for controlling the same are disclosed. The cooling apparatus is adapted to cool a system in which a heat source generating heat is arranged. The cooling apparatus includes an air stream forming unit which cools the heat source to a certain temperature, a sensing unit which includes a supplied-air temperature sensor for sensing a temperature of air supplied into the system, and a discharged-air temperature sensor for sensing a temperature of air discharged out of the system, an altitude detecting unit which detects an altitude of the system, based on the sensed supplied-air temperature and the sensed discharged-air temperature, and a cooling controller which controls the air stream forming unit, based on the detected altitude.

10 Claims, 8 Drawing Sheets

COOLING APPARATUS AND METHOD FOR CONTROLLING THE SAME

This application claims the benefit of Korean Patent Application No. 10-2005-0026309, filed on Mar. 30, 2005 and No. 10-2005-0026321, filed on Mar. 30, 2005, which is hereby incorporated by reference as if fully set forth herein.

BACKGROUND OF THE INVENTION

1. Field of the Invention

The present invention relates to a cooling apparatus, and more particularly, to a cooling apparatus for a system including a heat source, and a method for controlling the cooling apparatus.

2. Discussion of the Related Art

A variety of systems such as computers, projectors, and projection type television receivers inevitably have heat sources. Heat generated from such a heat source should be effectively dissipated, in order to enable the associated system to operate normally, and to prevent elements arranged around the heat source from being damaged due to the heat.

In order to dissipate heat generated from a heat source, namely, to cool the heat source, a forced convection air cooling system is mainly used which forcibly circulates air by forced convection, using a cooling fan.

The most fundamental factors to be reviewed or estimated in designing a forced convection air cooling system are the amount of heat generated from a heat source and the amount of air required to completely dissipate the generated heat. These factors depends on the following Expression 1:

$$Q = \dot{m} \cdot C_p \cdot \Delta T \quad \text{[Expression 1]}$$

where, "Q" represents the amount of heat generated from a heat source, "$\dot{m}$" represents a mass flow rate of air, "$C_p$" represents specific heat, and "$\Delta T$" represents the temperature difference between air supplied to cool the heat source and air discharged after being used to cool the heat source.

When the mass flow rate $\dot{m}$ in Expression 1 is converted to a volume flow rate, the following Expression 2 is obtained:

$$Q = \rho \cdot \dot{V} \cdot C_p \cdot \Delta T \quad \text{[Expression 2]}$$

where, "$\rho$" represents the density of air, and "$\dot{V}$" represents a volume flow rate of air.

Expression 2 can be rearranged as the following Expression 3:

$$\dot{V} = \frac{Q}{\rho \cdot C_p \cdot \Delta T} \quad \text{[Expression 3]}$$

Referring to Expression 3, it can be seen that the volume flow rate of air, $\dot{V}$, required to cool a system, in which the heat source is arranged, is a function of the density of air, $\rho$.

That is, even when air is used to dissipate heat generated from a heat source, the required volume flow rate of the air, $\dot{V}$, is varied depending on a variation in the density of the air, $\rho$.

FIG. 1 is a graph depicting a variation in the density of air depending on altitude.

Referring to FIG. 1, it can be seen that different volume flow rates of air are required to dissipate heat generated from a system in areas of different altitudes, respectively. For example, in an area at an altitude of 1,250 m, a volume flow rate of air is required which is larger than that of an area at an altitude of 0 m by about 13%. In an area at an altitude of 2,500 m, a volume flow rate of air is required which is larger than that of an area at an altitude of 0 m by about 28%.

To this end, conventionally, the design of a cooler for a system in which a heat source is present is made on the basis of an area where the density of air is low, namely, an area of a high altitude.

However, when the cooler design is made on the basis of an area of a high altitude, there is a possibility that system overcooling may occur in areas where the density of air is high. In such areas, there are additional problems of unnecessarily excessive power consumption and excessive noise.

In order to solve these problems, an altimeter is provided in conventional systems. In this case, the altimeter detects the altitude of the associated system. Based on the detected altitude, the rotating speed of a cooling fan for cooling the system is controlled. Thus, the system is cooled in a controlled manner.

In most conventional systems, expensive pressure meters are used for altimeters. For this reason, there is a problem in that an increase in system manufacturing costs occurs.

Taking into consideration the above-mentioned problem, a system only suitable for a low altitude and a system only suitable for a high altitude have been separately developed. A method has also been developed wherein the cooler of a system is tuned in accordance with a desired altitude when the system is delivered from a factory, so as to enable the cooler to appropriately cool the system at the desired altitude.

However, these methods have a problem in that they are unsuitable for notebook computers which are conveniently usable by virtue of their mobility and portability.

SUMMARY OF THE INVENTION

Accordingly, the present invention is directed to a cooling apparatus and a method for controlling the same that substantially obviate one or more problems due to limitations and disadvantages of the related art.

An object of the present invention is to provide a cooling apparatus and a method for controlling the same which are capable of effectively cooling a heat source in accordance with an altitude of the heat source measured based on the temperature difference between air supplied to cool the heat source and air discharged after being used to cool the heat source.

Another object of the present invention is to provide a cooling apparatus and a method for controlling the same which are capable of effectively cooling a heat source while minimizing generation of noise by a cooling fan used to cool the heat source.

Still another object of the present invention is to provide a cooling apparatus and a method for controlling the same which are capable of stepwise increasing or decreasing the rotating speed of a cooling fan used to cool a heat source, and thus, maximizing the comfort of the user expected in accordance with low-noise driving of the cooling fan.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, an apparatus for cooling a system in which a heat source generating heat is arranged, comprising: at least one air stream forming unit which cools the heat source to a certain temperature; a sensing unit which includes a supplied-air temperature sensor for sensing a temperature of air supplied into the system, and a discharged-air temperature sensor for sensing a temperature of air discharged out of the system; an altitude detecting unit which detects an altitude of the system, based on the sensed supplied-air temperature and the sensed discharged-air temperature; and a cooling controller which controls the air stream forming unit, based on the detected altitude.

The air stream forming unit may comprise a cooling fan which rotates to cool the heat source, and a fan motor which rotates the cooling fan.

The air stream forming unit may be arranged between the heat source and the supplied-air temperature sensor or between the heat source and the discharged-air temperature sensor. The at least one air stream forming unit may comprise an air stream forming unit arranged between the heat source and the supplied-air temperature sensor, and an air stream forming unit arranged between the heat source and the discharged-air temperature sensor.

The heat source, the air stream forming unit, and the sensing unit may be arranged in a single duct.

The altitude detecting unit may comprise a supplied-air temperature detector which detects the supplied-air temperature sensed by the supplied-air temperature sensor, a discharged-air temperature detector which detects the discharged-air temperature sensed by the discharged-air temperature sensor, a temperature difference calculator which calculates the detected supplied-air temperature and the detected discharged-air temperature, a supplied-air temperature decrease detector which detects a decrease in the detected supplied-air temperature, and an altitude determiner which compares the calculated temperature difference with a reference value predetermined for determination of the altitude.

The cooling controller may comprise a memory which stores information about rotating speeds of the air stream forming unit depending on altitudes, a speed determiner which determines a rotating speed of the air stream forming unit corresponding to the detected altitude, using the information stored in the memory, and a driver which drives the air stream forming unit at the determined rotating speed.

In another aspect of the present invention, a method for controlling a cooling apparatus of a system, in which a heat source, and an air stream forming unit are arranged, the air stream forming unit being included in the cooling apparatus to cool the heat source, comprises the steps of: detecting a temperature of air supplied into the system and a temperature of air discharged out of the system; calculating a temperature difference between the detected supplied-air temperature and the detected discharged-air temperature; determining an altitude of the system, based on the calculated temperature difference; determining a rotating speed of the air stream forming unit, based on the determined altitude and the detected supplied-air temperature; and driving the air stream forming unit at the determined rotating speed, to cool the heat source.

The method may further comprise the steps, prior to the step of detecting the supplied-air temperature and the discharged-air temperature, of turning on the system, executing an initialization operation for the system, and determining whether or not a time, at which a maximal amount of heat is generated from the heat source, has passed.

The method may further comprise the steps, prior to the step of determining the altitude of the system, of determining whether or not the calculated temperature difference corresponds to a temperature difference enabling the cooling of the heat source to be normally carried out, and determining whether or not a decrease in the supplied-air temperature has occurred when it is determined that the calculated temperature difference corresponds to the temperature difference enabling the cooling of the heat source to be normally carried out.

The step of determining the altitude of the system may comprise the steps of comparing the calculated temperature difference with a first reference value and a second reference value which are predetermined for the determination of the altitude, and determining the altitude of the system based on the results of the comparison. The step of determining the rotating speed of the air stream forming unit may include the steps of determining a temperature zone corresponding to the determined altitude and the detected supplied-air temperature, using an altitude-dependent temperature zone table, determining whether or not the temperature zone, which is currently determined, is different from a previously-determined temperature zone, determining a rotating speed corresponding to the determined altitude and the currently-determined temperature zone, using an altitude-and-temperature-zone-dependent rotating speed duty ratio table, when the currently-determined temperature zone is different from a previously-determined temperature zone, and comparing the rotating speed, which is currently determined, with a previously-determined rotating speed, and determining whether the rotating speed has increased or decreased, based on the result of the comparison.

The method may further comprise the steps, prior to the step of driving the air stream forming unit, of determining whether or not the system is turned off, and ending the control of the system when it is determined that the system is turned off.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

The concept of the present invention is to effectively cool a heat source, which is inevitably included internally in a system such as a computer, a projector, or a projection type television receiver, while minimizing generation of noise by a cooling fan used to cool the system, by measuring the altitude of the system, and controlling the rotating speed of the cooling fan in accordance with the measured altitude and the temperature of air supplied to the heat source by the cooling fan.

Generally, the temperature difference between air supplied to the heat source and air discharged after being used to cool the heat source is varied depending on the density of the air under the condition in which the flow rate of the air is constant.

That is, when the density of the air is high, the temperature difference between the supplied air and the discharged air is small. On the other hand, when the density of the air is low, the temperature difference between the supplied air and the discharged air is large.

In accordance with the present invention, the altitude of the system is measured on the basis of the principle that the temperature difference between air supplied to the heat source and air discharged after being used to cool the heat source is varied depending on the density of the air. Respective temperatures of the supplied air and discharged air are detected using temperature sensors. The altitude of the system is determined by calculating the difference between the measured temperatures, and comparing the calculated temperature difference with a reference value for altitude determination.

Hereinafter, a cooling apparatus and a method for controlling the same in accordance with the present invention will be described with reference to FIGS. 2 to 8.

Figure 1:
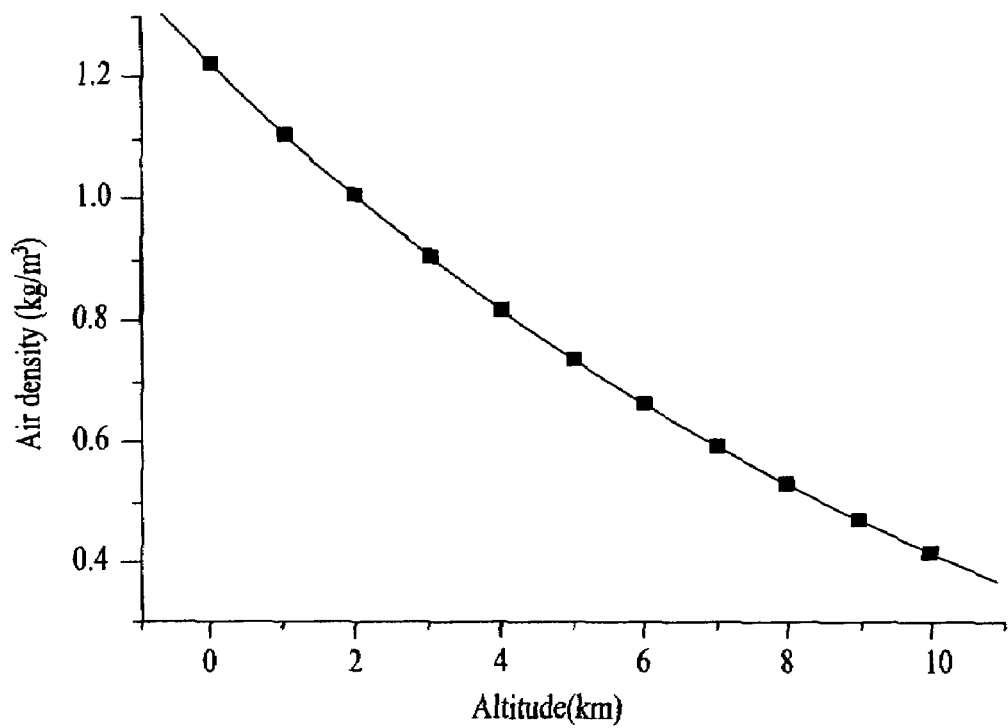
FIG. 1 is a graph depicting a variation in the density of air depending on altitude.
Figure 2:
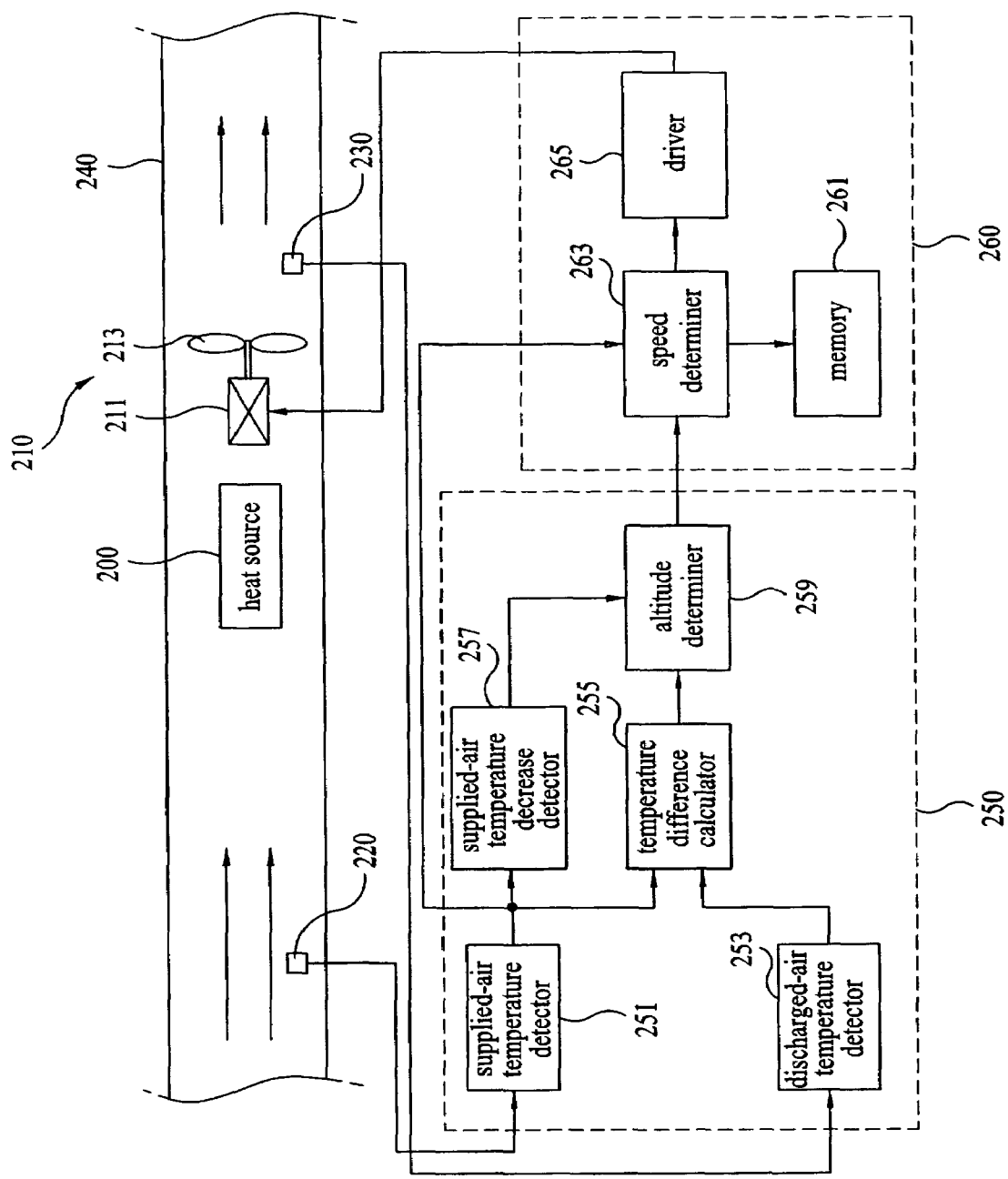
FIG. 2 is a schematic diagram illustrating a configuration of the cooling apparatus according to a first embodiment of the present invention.

FIG. 2 is a schematic diagram illustrating a configuration of the cooling apparatus according to a first embodiment of the present invention.

In FIG. 2, reference numeral "200" designates a heat source which generates heat, such as a light source internally arranged in a system such as a projector or a projection type television receiver. Reference numeral "210" designates an air stream forming unit which forms an air stream to cool the heat source.

The air stream forming unit 210 includes a fan motor 211, and a cooling fan 213 which causes air to pass around the heat source 200 while rotating in accordance with a driving operation of the fan motor 211, thereby cooling the heat source 200.

Reference numeral "220" designates a supplied-air temperature sensor which measures the temperature of air supplied to the heat source 200. Reference numeral "230" designates a discharged-air temperature sensor which measures the temperature of air discharged after cooling the heat source 200.

The heat source 200, the fan motor 211 and cooling fan 213 of the air stream forming unit 210, the supplied-air temperature sensor 220, and the discharged-air temperature sensor 230 are arranged in a duct 240, in order to enable the supplied-air temperature sensor 220 and discharged-air temperature sensor 230 to accurately detect the temperature of the air supplied to the heat source 200 in accordance with operation of the air stream forming unit 210 and the temperature of the air discharged after cooling the heat source 200 in accordance with operation of the air stream forming unit 210.

Reference numeral "250" designates an altitude detecting unit which detects the temperature of the supplied air and the temperature of the discharged air, based on respective output signals from the supplied-air temperature sensor 220 and discharged-air temperature sensor 230, calculates the difference between the detected temperatures, and determines the altitude of the system based on the calculated temperature difference.

The altitude detecting unit 250 includes a supplied-air temperature detector 251 which detects the temperature of air supplied to the heat source 200, based on an output signal from the supplied-air temperature sensor 220, and a discharged-air temperature detector 253 which detects the temperature of air discharged after cooling the heat source 200, based on an output signal from the discharged-air temperature sensor 230. The altitude detecting unit 250 also includes a temperature difference calculator 255 which calculates the temperature difference between the supplied air and the discharged air, based on output signals from the supplied-air temperature detector 251 and discharged-air temperature detector 253, a supplied-air temperature decrease detector 257 which detects whether or not the supplied-air temperature detected by the supplied-air temperature detector 251 decreases, and an altitude determiner 259 which compares the difference between the supplied-air temperature and the discharged-air temperature calculated by the temperature difference calculator 255 with a plurality of predetermined reference values for altitude determination when no supplied-air temperature decrease is detected by the supplied-air temperature decrease detector 257.

Reference numeral "260" designates a cooling controller which controls the fan motor 211 of the air stream forming unit 210 to operate, based on the altitude determined by the altitude determiner 259 of the altitude detecting unit 250 and the supplied-air temperature detected by the supplied-air temperature detector 251, thereby causing the heat source 200 to be cooled.

The cooling controller 260 includes a memory 261, in which a table of temperature zones depending on altitudes and a table of rotating speed duty ratios depending on altitudes and temperature zones are previously stored. The cooling controller 260 also includes a speed determiner 263 which determines the rotating speed of the air stream forming unit 210, based on the altitude determined by the altitude determiner 259 of the altitude detecting unit 250 and the supplied-air temperature detected by the supplied-air temperature detector 251, referring to the altitude-dependent temperature zone table and the altitude-and-temperature-zone-dependent rotating speed duty ratio table which are previously stored in the memory 261. The cooling controller 260 further includes a driver 265 which drives the fan motor 211 of the air stream forming unit 210 at the rotating speed determined by the speed determiner 263.

In the cooling apparatus having the above-described configuration according to the first embodiment of the present invention, in order to dissipate heat generated from the heat source 200 when the system operates, the driver 265 of the cooling controller 260 drives the fan motor 211 of the air stream forming unit 210, thereby causing ambient air to enter the duct 240 and then to pass around the supplied-air temperature sensor 220, heat source 200, air stream forming unit 210, and discharged-air temperature sensor 230, in this order.

Preferably, the driver 265 drives the fan motor 211 of the air stream forming unit 210 at a predetermined speed, for example, a minimal speed, in order to minimize generation of noise at the fan motor 211.

The supplied-air temperature sensor 220 and discharged-air temperature sensor 230 detect the temperature of air supplied to the heat source 200 and the temperature of air discharged after cooling the heat source 200, respectively, and outputs detect signals representing the detected temperatures to the supplied-air temperature detector 251 and discharged-air temperature detector 253 of the altitude detecting unit 250, respectively. The supplied-air temperature detector 251 and discharged-air temperature detector 253 detect the supplied-air temperature and discharged-air temperature, based on the detected signals from the supplied-air temperature sensor 220 and discharged-air temperature sensor 230, respectively.

After the time at which the heat source 200 generates a maximal amount of heat is detected by a maximal heat amount generation detector (not shown), the temperature difference calculator 255 calculates the difference between the supplied-air temperature output from the supplied-air temperature detector 251 and the discharged-air temperature output from the discharged-air temperature detector 253, and outputs a signal representing the calculated temperature difference to the altitude determiner 259. Meanwhile, the supplied-air temperature decrease detector 257 detects whether or not the supplied-air temperature decreases, and outputs a signal representing the result of the detection to the altitude determiner 259.

The altitude determiner 259 determines whether or not the supplied-air temperature decreases, based on the output signal from the supplied-air temperature decrease detector 257. When it is determined that the supplied-air temperature decreases, the altitude determiner 259 does not perform the altitude determination. The reason why the altitude determiner 259 does not perform the altitude determination when the supplied-air temperature decreases will be described hereinafter.

Where the system is an air conditioner, cold air discharged out of the duct 240 may be directly re-introduced into the duct 240 in accordance with operation of the air stream forming unit 210.

In this case, the temperature of air supplied to the heat source 200 decreases gradually without becoming stable. In accordance with the decreased supplied-air temperature, the difference between the supplied-air temperature and the discharged-air temperature increases greatly. This temperature difference increase may be erroneously determined as being caused by an abrupt increase in altitude.

Accordingly, in accordance with the present invention, the altitude determiner 259 determines whether or not the supplied-air temperature decreases, based on the output signal from the supplied-air temperature decrease detector 257, and does not perform the altitude determination when it is determined that the supplied-air temperature decreases.

When it is determined, based on the output signal from the supplied-air temperature decrease detector 257, that no decrease in supplied-air temperature occurs, the altitude determiner 259 compares the difference between the supplied-air temperature and the discharged-air temperature calculated by the calculator 255 with predetermined reference values for altitude detection, to determine the altitude of the system.

For example, for altitude determination, a first reference value and a second reference value, which are different from each other, are previously set in the altitude determiner 259. When the temperature difference calculated by the temperature calculator 255 is higher than the second reference value, the altitude determiner 259 determines that the altitude of the system is high. In this case, the altitude determiner 259 determines that the system has an altitude of "2". On the other hand, when the calculated temperature difference is not lower than the first reference value, but not higher than the second reference value, the altitude determiner 259 determines that the altitude of the system is intermediate. In this case, the altitude determiner 259 determines that the system has an altitude of "1". Meanwhile, when the calculated temperature difference is lower than the first reference value, the altitude determiner 259 determines that the altitude of the system is low. In this case, the altitude determiner 259 determines that the system has an altitude of "0".

After the altitude determiner 259 determines the current altitude of the system, the speed determiner 263 determines the temperature zone of the system corresponding to the determined altitude and the supplied-air temperature detected by the supplied-air detector 251, using the altitude-dependent temperature zone table stored in the memory 261. Subsequently, the speed determiner 263 determines the rotating speed duty ratio of the fan motor 211 of the air stream forming unit 210 corresponding to the determined altitude and the determined temperature zone, using the altitude-and-temperature-zone-dependent rotating speed duty ratio table stored in the memory 261.

As described above, the altitude-dependent temperature zone table is stored in the memory 261. The speed determiner 263 determines the temperature zone of the system by comparing the supplied-air temperature with reference temperatures predetermined in association with the altitude determined by the altitude determiner 259.

For example, when the supplied-air temperature is lower than a first reference temperature predetermined in association with the altitude of "0", the speed determiner 263 determines that the temperature zone of the system is "0". On the other hand, when the supplied-air temperature is not lower than the first reference temperature, but not higher than a second reference temperature predetermined in association with the altitude of "0", the speed determiner 263 determines that the temperature zone of the system is "1". Meanwhile, when the supplied-air temperature is not lower than the second reference temperature, but not higher than a third reference temperature predetermined in association with the altitude of "0", the speed determiner 263 determines that the temperature zone of the system is "2".

As described above, the altitude-and-temperature-zone-dependent rotating speed duty ratio table is also stored in the memory 261. The speed determiner 263 determines the rotating speed duty ratio of the fan motor 211 corresponding to the determined altitude and the determined temperature zone.

After the speed determiner 263 determines the rotating speed duty ratio of the fan motor 211, the driver 265 generates a pulse width modulation (PWM) signal which has the determined rotating speed duty ratio. The generated PWM signal is sent to the fan motor 211 which, in turn, rotates at a rotating speed corresponding to the determined rotating speed duty ratio. In accordance with the rotation of the fan motor 211, the cooling fan 213 is rotated, thereby causing ambient air to be introduced into the duct 240. The introduced air passes around the heat source 200, and is then discharged out of the duct 240 after cooling the heat source 200.

In this case, it is preferred that the driver 265 vary the rotating speed of the fan motor 211 in such a manner that the rotating speed of the fan motor 211 increases stepwise slowly to a target speed, and decreases to a target speed in one step, in order to maximize the comfort of the user expected in accordance with low-noise driving of the cooling fan 213.

Figure 3:
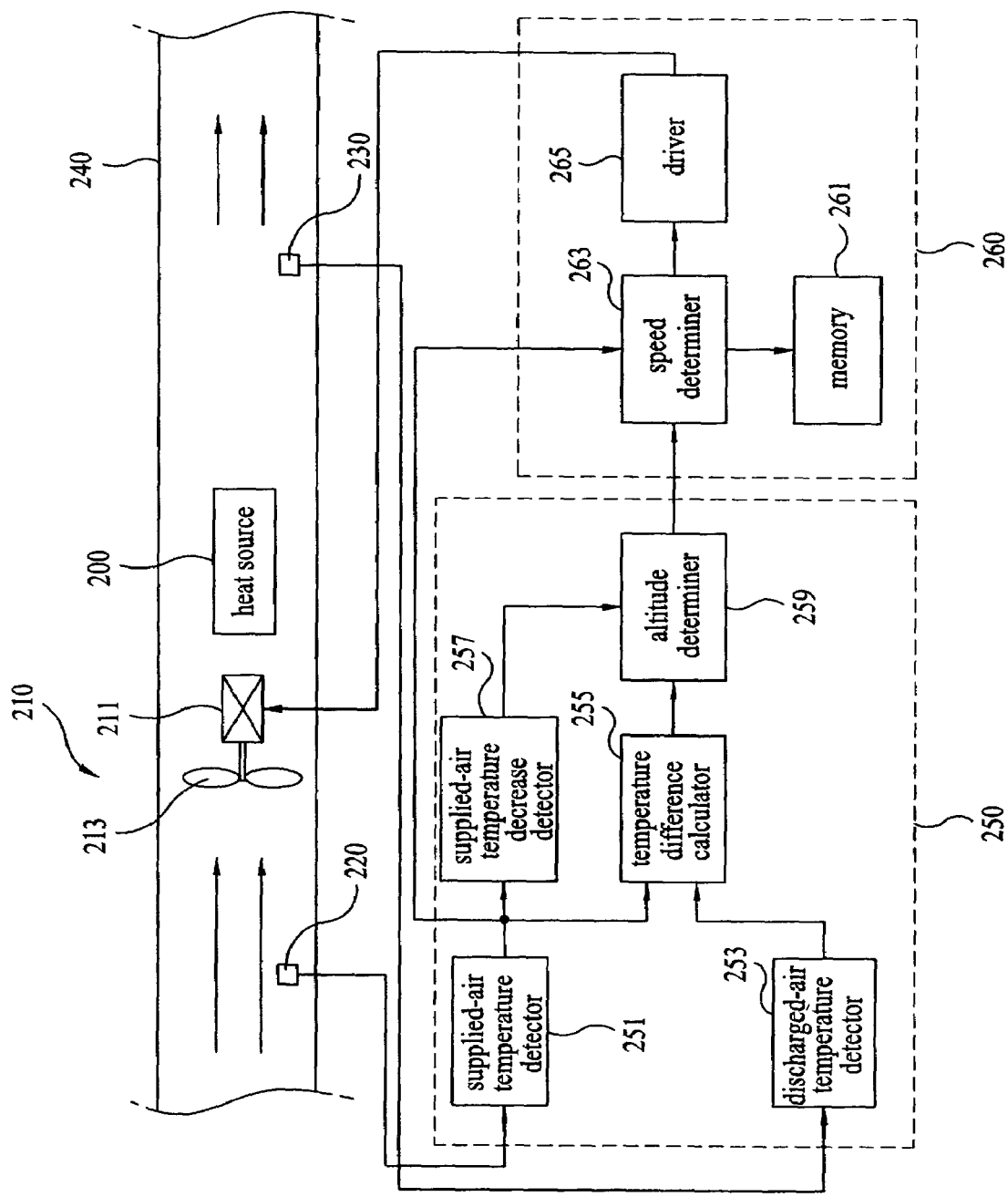
FIG. 3 is a schematic diagram illustrating a configuration of the cooling apparatus according to a second embodiment of the present invention.

FIG. 3 is a schematic diagram illustrating a configuration of the cooling apparatus according to a second embodiment of the present invention.

Figure 4:
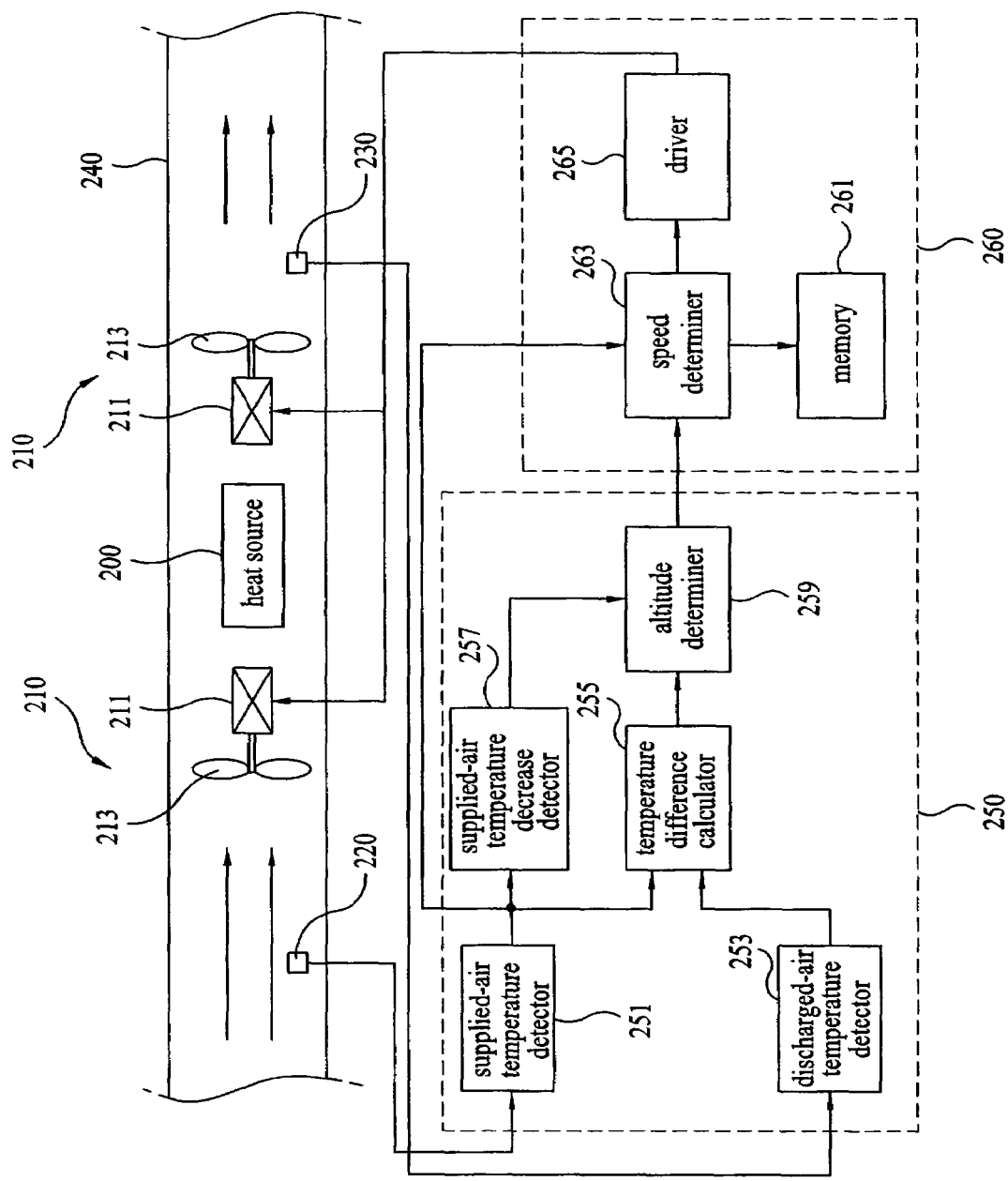
FIG. 4 is a schematic diagram illustrating a configuration of the cooling apparatus according to a third embodiment of the present invention.

The second embodiment of the present invention is different from the first embodiment of the present invention in terms of the arrangement of the air stream forming unit 210. As shown in FIG. 3, the air stream forming unit 210 may be arranged between the supplied-air temperature sensor 220 and the heat source 200, differently from the first embodiment of the present invention in which the air stream forming unit 210 is arranged between the heat source 200 and the discharged-air temperature sensor 230. In this case, similarly to the first embodiment of the present invention, it is possible to detect the altitude of the system and the temperature of the supplied air, to determine the rotating speed of the fan motor 211, based on the detected altitude and the detected supplied-air temperature, and to rotate the fan motor 211 based on the determined rotating speed, and thus, to cool the heat source 200. Also, as shown in FIG. 4, two air stream forming units 210 may be arranged between the supplied-air temperature sensor 220 and the heat source 200 and between the heat source 200 and the discharged-air temperature sensor 230, respectively. In this case, similarly to the first embodiment of the present invention, it is possible to detect the altitude of the system and the temperature of the supplied air, to determine the rotating speed of each fan motor 211, based on the detected altitude and the detected supplied-air temperature, and to rotate the fan motor 211 based on the determined rotating speed, and thus, to cool the heat source 200.

Figure 5:
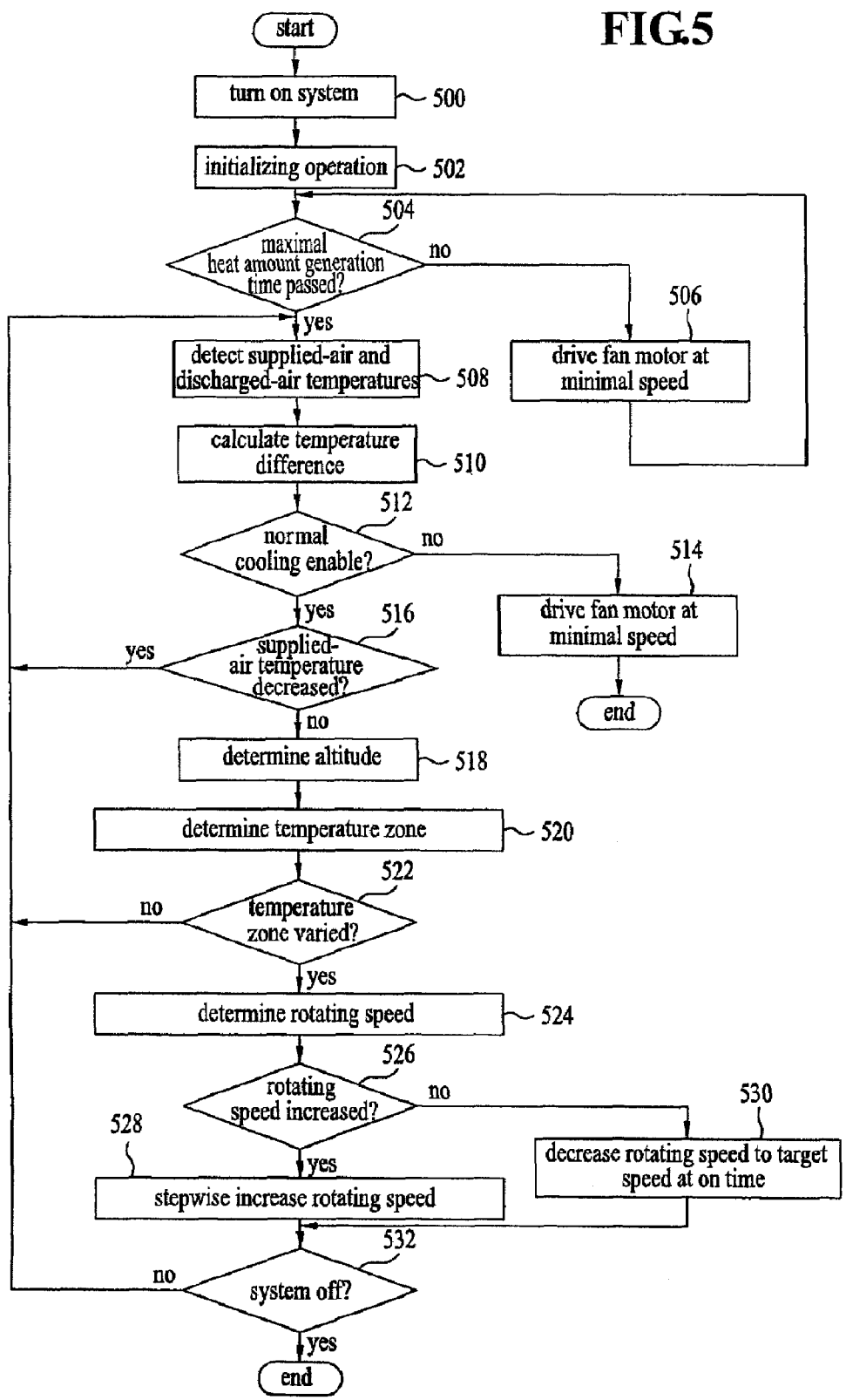
FIG. 5 is a flow chart illustrating a method for controlling the cooling apparatus in accordance with the present invention.

FIG. 5 is a flow chart illustrating the method for controlling the cooling apparatus in accordance with the present invention.

In accordance with this method, as shown in FIG. 5, an initializing operation is executed at step 502 when the system turns on.

In the initializing operation, for example, the altitude at which the system is positioned is set to an initial value, namely, "0", and the rotating speed of the fan motor 211 is set to a minimal speed.

At step 504, the altitude detecting unit 250 determines whether or not a predetermined time at which a maximal amount of heat will be generated from the heat source 200 after the heat source 200 begins to operate has passed. The time may be experimentally determined. When it is determined by the altitude detecting unit 250 that the predetermined time has not passed, the cooling controller 260 drives the fan motor 211 at a minimal speed at step 506, to cause ambient air to be introduced into the duct 240, and thus, to cool the heat source 200, under the condition in which generation of noise is minimized.

When the predetermined time at which a maximal amount of heat will be generated from the heat source 200 has passed, the supplied-air temperature detector 251 and discharged-air temperature detector 253 of the altitude detecting unit 250 detect the supplied-air temperature and the discharged-air temperature, based on detect signals output from the supplied-air temperature sensor 220 and discharged-air temperature sensor 230, respectively, at step 508. At step 510, the temperature difference calculator 255 calculates the difference between the detected supplied-air temperature and the detected discharged-air temperature.

At step 512, the altitude detecting unit 250 determines whether or not the heat source 200 is normally cooled, based on the difference between the supplied-air temperature and the discharged-air temperature calculated by the temperature difference calculator 255.

That is, when the air introduced into the duct 240 is not normally circulated due to, for example, blocking of an air inlet or air outlet of the duct 240, the difference between the supplied-air temperature and the discharged-air temperature becomes excessively high. In this case, it is impossible to normally cool the heat source 200.

To this end, the altitude detecting unit 250 compares the temperature difference calculated by the temperature difference calculator 255 with a predetermined maximal temperature difference. When it is determined that the calculated temperature difference is more than the predetermined maximal temperature difference, the altitude detecting unit 250 determines that it is impossible to normally cool the heat generator 200. On the other hand, when it is determined that the calculated temperature difference is not more than the predetermined maximal temperature difference, the altitude detecting unit 250 determines that it is possible to normally cool the heat generator 200.

When it is determined at step 512, based on an excessive temperature difference, that it is impossible to normally cool the heat source 200, the altitude detecting unit 250 runs the fan motor at minimal speed at step 514, in order to prevent the system from being damaged. Thus, the control procedure is ended.

On the other hand, when it is determined at step 512 that it is possible to normally cool the heat source 200, the altitude detecting unit 250 determines, at step 516, whether or not the supplied-air temperature decreases, based on the detect signal from the supplied-air temperature decrease detector 257.

That is, when the temperature of the air introduced into the duct 240 decreases gradually without becoming stable, the difference between the supplied-air temperature and the discharged-air temperature is increased. In this case, the altitude detecting unit 250 may erroneously determine the temperature difference increase as being caused by an abrupt increase in altitude.

To this end, in accordance with the present invention, when it is determined at step 516 that the supplied-air temperature decreases, the altitude detecting unit 250 waits until the supplied-air temperature becomes stable without being decreased, in order to prevent erroneous altitude determination.

When it is determined at step 516 that the air introduced into the duct 240 becomes stable, and thus, the supplied-air temperature is maintained at a certain temperature without being decreased, or the supplied-air temperature increases, the altitude detecting unit 250 compares, at step 518, the temperature difference calculated by the temperature difference calculator 255 with the first and second predetermined reference values for altitude determination.

During the operation of the air stream forming unit 210, the air discharged out of the duct 240 after being used to cool the heat source 200 may be re-introduced into the duct 240. In this case, the supplied-air temperature detected by the supplied-air detector 251 may increase.

In this case, however, the altitude determination is normally executed because an increase in supplied-air temperature has no influence on the detection of altitude.

Figure 6:
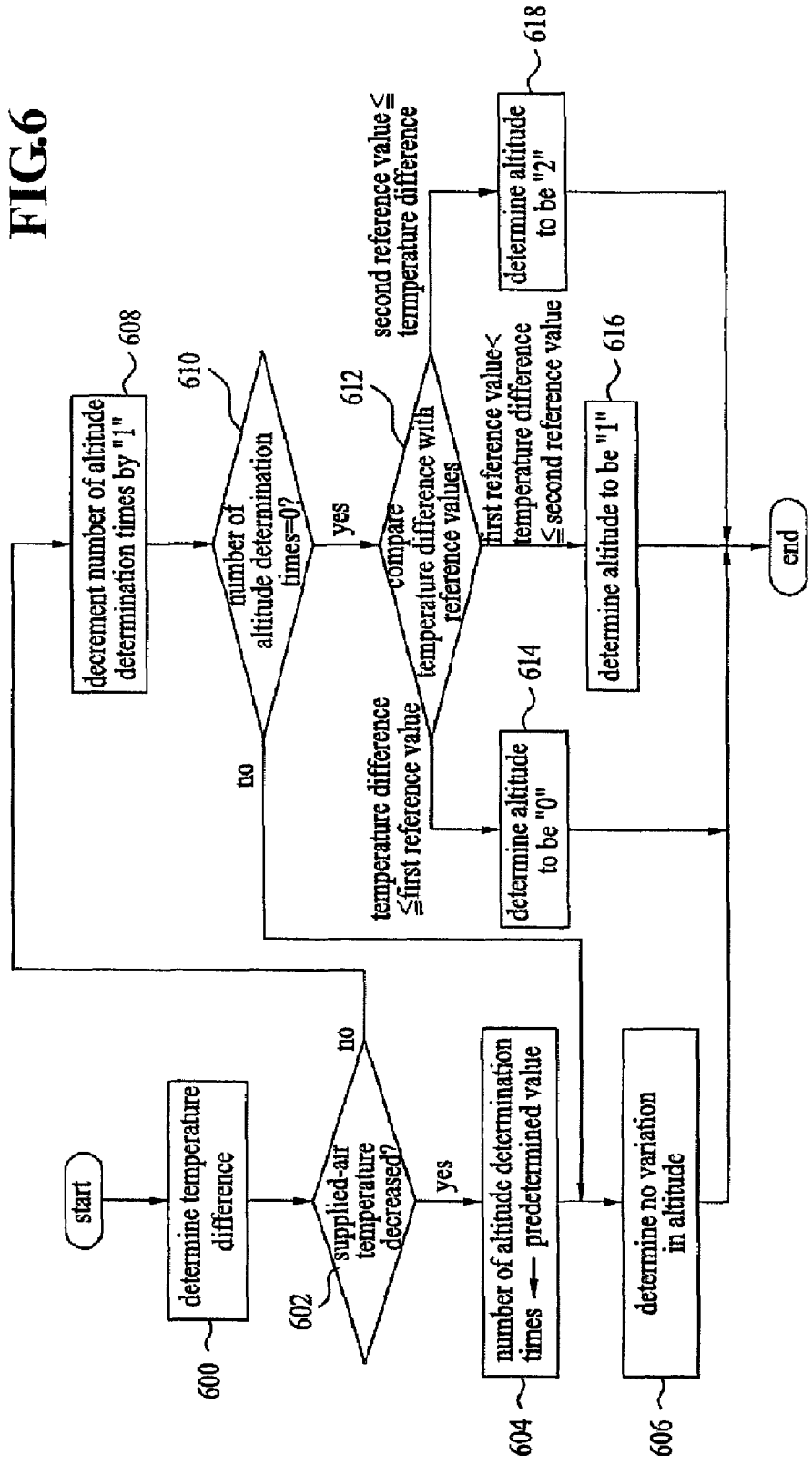
FIG. 6 is a flow chart illustrating an altitude determination procedure in the method of FIG. 5 according to an embodiment of the present invention.

The altitude determination at step 518 is executed in accordance with a procedure shown in FIG. 6. That is, the altitude determiner 259 of the altitude detecting unit 250 determines, at step 600, the difference between the supplied-air temperature and the discharged-air temperature calculated by the temperature difference calculator 255. At step 602, the altitude determiner 259 determines whether or not the supplied-air temperature decreases, based on an output signal from the supplied-air temperature decrease detector 257.

When it is determined at step 602 that the supplied-air temperature decreases, there may be errors in the determination of altitude. To this end, the altitude determiner 259 sets the number of times to execute the altitude determination to a predetermined value at step 604. When it is determined at step 606 that the currently-determined altitude is equal to the previously-determined altitude, namely, there is no variation in altitude, the operation of executing the altitude determination is ended.

On the other hand, when it is determined at step 602 that no decrease in supplied-air temperature occurs, the altitude determiner 259, at step 608, decrements the number of altitude determination times by "1", and then determines, at step 610, whether or not the number of remaining altitude determination times corresponds to "0". When it is determined that the number of remaining altitude determination times does not correspond to "0", the altitude determiner 259 determines, at step 606, whether or not the currently-determined altitude is equal to the previously-determined altitude, namely, there is no variation in altitude. When it is determined at step 606 that the currently-determined altitude is equal to the previously-determined altitude, the operation of executing the altitude determination is ended.

When it is determined at step 610 that the number of remaining altitude determination times corresponds to "0", the altitude determiner 259 compares the calculated temperature difference with the first and second predetermined reference values at step 612.

When it is determined at step 612 that the calculated temperature difference is not higher than the first reference value, the altitude determiner 259 determines, at step 614, that the altitude of the system is "0". On the other hand, when it is determined at step 612 that the calculated temperature difference is higher than the first reference value, but not higher than the second reference value, the altitude determiner 259 determines, at step 616, that the altitude of the system is "1". Also, when it is determined at step 612 that the calculated temperature difference is higher than the second reference value, the altitude determiner 259 determines, at step 618, that the altitude of the system is "2". After this determination, the altitude determination procedure is ended.

Figure 7:
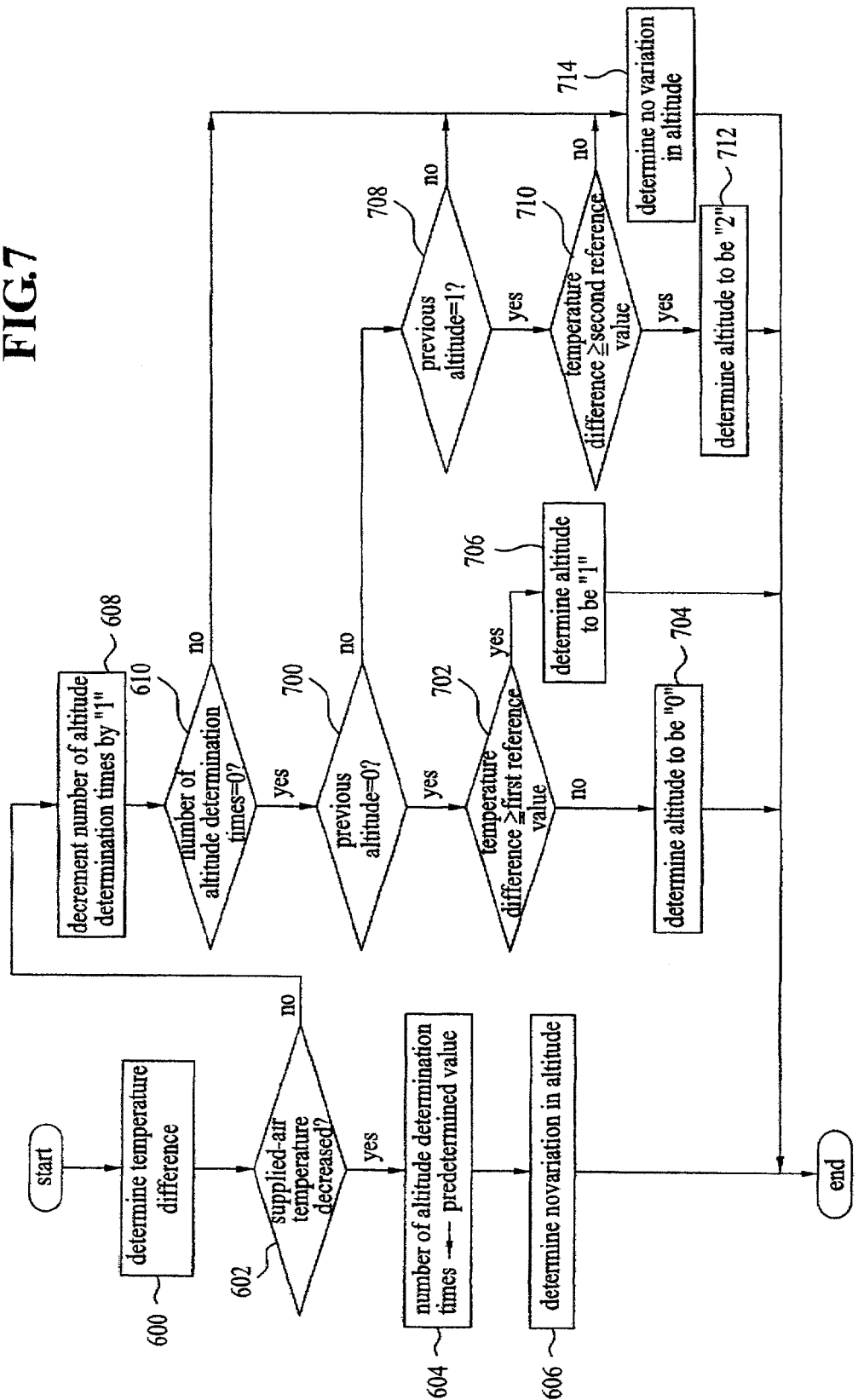
FIG. 7 is a flow chart illustrating an altitude determination procedure in the method of FIG. 5 according to another embodiment of the present invention.

FIG. 7 is a flow chart illustrating an altitude determination procedure according to another embodiment of the present invention.

In this procedure, as shown in FIG. 7, when it is determined at step 610 that the number of altitude determination times corresponds to "0", the altitude determiner 259 determines, at step 700, whether the previously-determined altitude is "0". When it is determined at step 700 that the previously-determined altitude is "0", the altitude determiner 259 compares, at step 702, the calculated temperature difference between the supplied-air temperature and the discharged-air temperature with the first reference value predetermined for the determination of altitude, to determine whether or not the temperature difference is not lower than the first reference value.

When it is determined at step 702 that the temperature difference is lower than the first reference value, the altitude determiner 259 determines, at step 704, that the current altitude is "0", equally to the previously-determined altitude. On the other hand, when the temperature difference is not lower than the first reference value, the altitude determiner 259 determines, at step 706, that the current altitude is "1".

Meanwhile, when it is determined at step 700 that the previously-determined altitude does not correspond to "0", and it is then determined at step 708 that the previously-determined altitude is "1", the altitude determiner 259 compares, at step 710, the calculated temperature difference between the supplied-air temperature and the discharged-air temperature with the second reference value predetermined for the determination of altitude, to determine whether or not the temperature difference is not lower than the second reference value.

When it is determined at step 710 that the temperature difference is not lower than the second reference value, the altitude determiner 259 determines, at step 712, that the current altitude is "2". On the other hand, when the temperature difference is lower than the second reference value, the altitude determiner 259 determines, at step 714, that no variation in altitude occurs. That is, the altitude determiner 259 determines that the current altitude is "1", equal to the previously-determined altitude. After this determination, the altitude determination procedure is ended.

Thus, in accordance with the present invention, when the supplied-air temperature decreases, no altitude determination is executed, and the number of altitude determination times is set to a predetermined value.

When the supplied-air temperature subsequently becomes stable without being decreased, the number of altitude determination times is decremented by "1".

When the number of altitude determination times corresponds to "0" as the stable state of the supplied-air temperature is maintained for a predetermined time, the temperature difference between the supplied-air temperature and the discharged-air temperature is compared with the first and second reference values predetermined for the altitude determination. Based on the result of the comparison, the altitude at which the system is positioned is determined to be "0", "1", or "2".

After the altitude of the system is determined in the above-described manner, the speed determiner 263 of the cooling controller 260 determines, at step 520, the temperature zone of the system corresponding to the determined altitude and the supplied-air temperature detected by the supplied-air detector 251, using the altitude-dependent temperature zone table previously stored in the memory 261.

Figure 8:
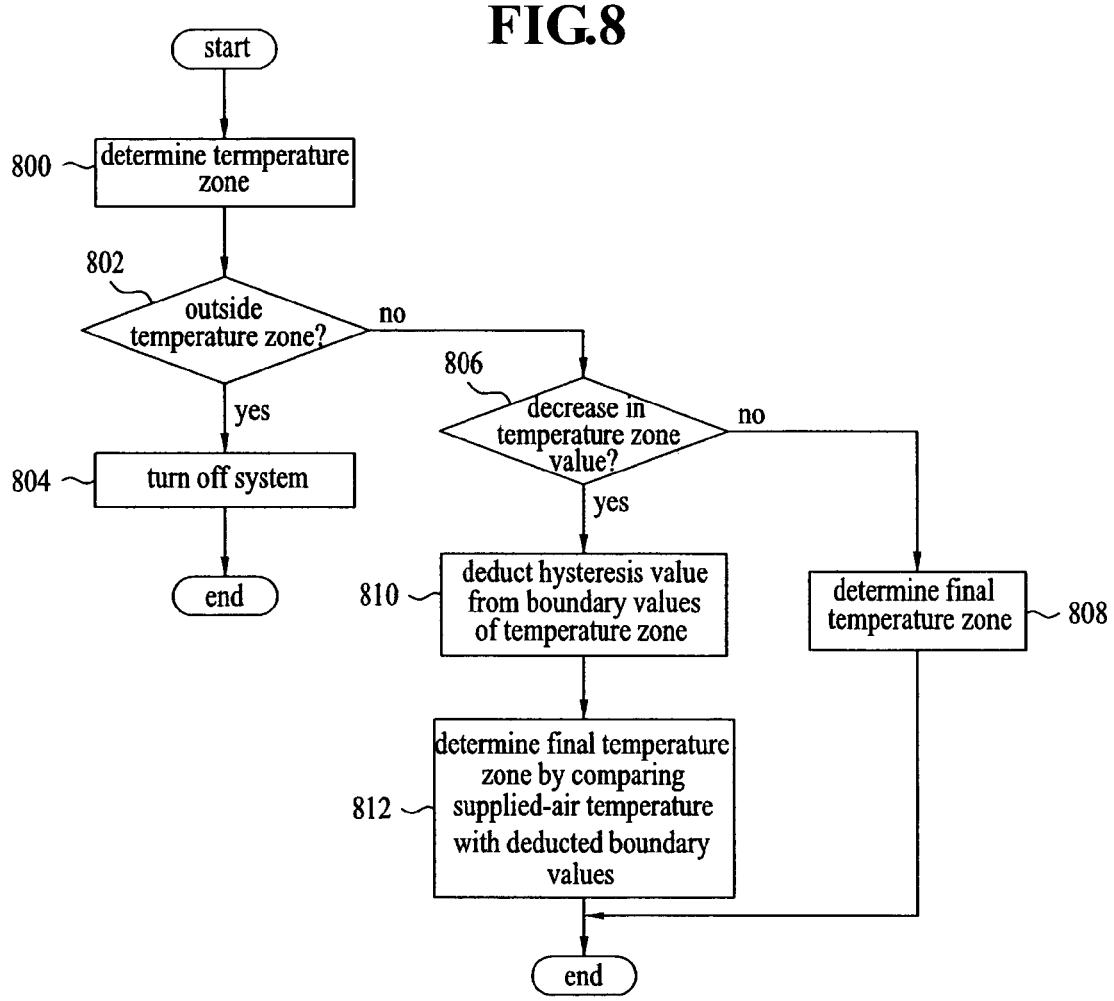
FIG. 8 is a flow chart illustrating a temperature zone determination procedure of FIG. 5.

The temperature zone determination at step 520 is executed in accordance with a procedure shown in FIG. 8. That is, at step 800, the temperature zone corresponding to the determined altitude and the supplied-air temperature is determined. At step 802, it is determined whether or not the supplied-air temperature is outside the determined temperature zone.

That is, it is determined, at step 802, whether or not the supplied-air temperature is higher than a maximal reference temperature predetermined for determination of a temperature zone.

When the supplied-air temperature is outside the determined temperature zone, it is impossible to normally cool the heat source 200. Accordingly, when it is determined at step 802 that the supplied-air temperature is outside the determined temperature zone, the speed determiner 263 turns off the system at step 804, in order to prevent the system from being damaged. Thus, the control procedure is ended.

On the other hand, when the supplied-air temperature is within the determined temperature zone, it is possible to normally cool the heat source 200. Accordingly, when it is determined at step 802 that the supplied-air temperature is within the determined temperature zone, the speed determiner 263 compares, at step 806, the currently-determined temperature zone with the previously-determined temperature zone, to determine whether or not a decrease in temperature zone value has occurred.

When it is determined at step 806 that no decrease in temperature zone value has occurred, the speed determiner 263 determines, at step 808, the current temperature zone to be a final temperature zone.

On the other hand, when it is determined at step 806 that a decrease in temperature zone value has occurred, the speed determiner 263 deducts, at step 810, a predetermined hysteresis value from the boundary values of the currently-determined temperature zone. At step 812, the speed determiner 263 then compares the supplied-air temperature with the deducted boundary values of the temperature zone, to determine a final temperature zone.

After the determination of the final temperature zone, the speed determiner 263, at step 522, determines whether or not the finally-determined temperature zone is equal to the previously-determined temperature zone. When the finally-determined temperature zone is equal to the previously-determined temperature zone, namely, when there is no variation in temperature zone, it is unnecessary to change the rotating speed of the air stream forming unit 210. In this case, accordingly, the control procedure is returned to step 508, to repeat the procedure of detecting the supplied-air temperature and discharged-air temperature, calculating the difference between the supplied-air temperature and the discharged-air temperature, and determining a temperature zone base on the calculated temperature difference.

On the other hand, when it is determined at step 522 that the finally-determined temperature zone is different from the previously-determined temperature zone, the speed determiner 263 determines, at step 524, the rotating speed duty ratio of the air stream forming unit 210 corresponding to the determined altitude and the determined temperature zone, using the altitude-and-temperature-zone-dependent rotating speed duty ratio table stored in the memory 261, and thus, determines the rotating speed of the fan motor 211. The speed determiner 263 then compares, at step 526, the current rotating speed with the previous rotating speed, to determine whether the rotating speed should be increased or decreased.

When it is determined at step 526 that the rotating speed should be increased, the driver 265 increases stepwise the duty ratio of a PWM signal output therefrom at step 528 until the duty ratio of the PWM signal corresponds to the determined rotating speed duty ratio of the air stream forming unit 210, in order to enable the rotating speed of the fan motor 211 to reach a target speed.

On the other hand, When it is determined at step 526 that the rotating speed should be decreased, the driver 265 decreases, step 530, the duty ratio of the PWM signal to a duty ratio corresponding to the determined rotating speed duty ratio of the air stream forming unit 210, in order to enable the rotating speed of the fan motor 211 to reach a target speed.

It is then determined, at step 532, whether or not the system turns off. When the system does not turn off, the control procedure is returned to step 508, to repeat the procedure of detecting the supplied-air temperature and discharged-air temperature, calculating the difference between the supplied-air temperature and the discharged-air temperature, and determining a temperature zone base on the calculated temperature difference. On the other hand, when the system turns off, the control procedure is ended.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

As apparent from the above description, the cooling apparatus and the method for controlling the same in accordance with the present invention have the following effects.

First, in accordance with the present invention, it is possible to effectively cool the heat source while minimizing generation of noise by determining the altitude of the system based on the difference between the supplied-air temperature and the discharged-air temperature, and controlling the rotating speed of the cooling fan based on the determined altitude and the supplied-air temperature.

Second, in accordance with the present invention, it is possible to maximize the comfort of the user expected in accordance with low-noise driving of the cooling fan by controlling the rotating speed of the cooling fan in such a manner that the rotating speed of the fan motor increases stepwise slowly to a target speed, and decreases to a target speed in one step.

What is claimed is:

1. An apparatus for cooling a system in which a heat source generating heat is arranged, comprising:
   at least one air stream forming unit which cools the heat source to a certain temperature;
   a sensing unit which includes a supplied-air temperature sensor for sensing a temperature of air supplied into the system, and a discharged-air temperature sensor for sensing a temperature of air discharged out of the system;
   an altitude detecting unit which detects an altitude of the system, based on the sensed supplied-air temperature and the sensed discharged-air temperature; and
   a cooling controller which controls the air stream forming unit, based on the detected altitude,
   wherein the altitude detecting unit comprises:
   a supplied-air temperature detector which detects the supplied-air temperature sensed by the supplied-air temperature sensor;
   a discharged-air temperature detector which detects the discharged-air temperature sensed by the discharged-air temperature sensor;
   a temperature difference calculator which calculates the difference between the detected supplied-air temperature and the detected discharged-air temperature;
   a supplied-air temperature decrease detector which detects a decrease in the detected supplied-air temperature; and
   an altitude determiner which compares the calculated temperature difference with a reference value predetermined for determination of the altitude.

2. The apparatus according to claim 1, wherein the air stream forming unit comprises:
   a cooling fan which rotates to cool the heat source; and
   a fan motor which rotates the cooling fan.

3. The apparatus according to claim 1, wherein the air stream forming unit is arranged between the heat source and the supplied-air temperature sensor or between the heat source and the discharged-air temperature sensor.

4. The apparatus according to claim 1, wherein the at least one air stream forming unit comprises an air stream forming unit arranged between the heat source and the supplied-air temperature sensor, and an air stream forming unit arranged between the heat source and the discharged-air temperature sensor.

5. The apparatus according to claim 1, wherein the heat source, the air stream forming unit, and the sensing unit are arranged in a single duct.

6. The apparatus according to claim 1, wherein the altitude determiner determines the altitude based on a detect signal from the supplied-air temperature decrease detector.

7. The apparatus according to claim 1, wherein the altitude detecting unit executes the altitude detection after a time, at which a maximal amount of heat is generated from the heat source, passes.

8. The apparatus according to claim 1, wherein the altitude detected by the altitude detecting unit has an increased value when the difference between the supplied-air temperature and the discharged-air temperature increases.

9. The apparatus according to claim 1, wherein the cooling controller comprises:

a memory which stores information about rotating speeds of the air stream forming unit depending on altitudes;

a speed determiner which determines a rotating speed of the air stream forming unit corresponding to the detected altitude, using the information stored in the memory; and a driver which drives the air stream forming unit at the determined rotating speed.

10. The apparatus according to claim 1, further comprising:

a maximal heat amount generating time detector which detects a time at which a maximal amount of heat is generated from the heat source.

\* \* \* \* \*